Patented Aug. 15, 1939

2,169,659

UNITED STATES PATENT OFFICE 2,169,659

ART OF SOLDERING

Percy Warren Noble, Unadilla, N. Y., and Alan Richard Powell, London, England

No Drawing. Application October 14, 1937, Serial No. 169,048. In Great Britain October 16, 1936

6 Claims. (Cl. 148—26)

It has already been proposed, when forming a joint between two articles of metal melting above 1100° centigrade, to introduce a piece of copper into the neighbourhood of the desired joint and then to apply heat to melt the copper. It has also been proposed to replace the copper by copper oxide. The heating in both cases is effected in a reducing atmosphere. Both of the said methods necessitate such high temperatures that the tensile properties of the metal of the articles are affected and after completion of the soldering operation it is necessary to subject the said metal to the thermal treatments necessary to bring it again to the desired condition. This is especially so when the metal in question is steel.

It has also been proposed to solder by means of mixtures of reducible metal oxides or salts with carbon or a cementing carbonaceous substance such as glue, the soldering being effected if desired in a reducing atmosphere. The mixtures may be made into pastes with water or aqueous ammonia. Soldering pastes have also been proposed which contain, in addition to finely divided metals, the metals in a chemically combined state as metal oxide, and also a reducing means, a flux and a binding medium. The reducing means may be carbon.

We have now found that excellent soldered joints can be obtained by using as the soldering medium a mixture of two or more metal compounds capable of reduction to metal at a temperature below 1000° centigrade to yield an alloy which melts below the said temperature, the soldering operation being effected by heating while maintaining a reducing atmosphere in the immediate neighbourhood and interstices of the joint.

Among metal compounds which may be used in admixture according to this invention there may be mentioned by way of example oxides such as copper oxide, silver oxide, zinc oxide, cadmium oxide, lead oxide and tin oxide.

We have found that a suitable oxidic mixture for use in soldering steel, brass, bronze and the like consists of silver and copper oxides in such proportions that the resulting alloy after reduction consists of the eutectic mixture (72 per cent of silver and 28 per cent of copper—melting point 778° centigrade). By adding tin oxide, zinc oxide or cadmium oxide, the melting point of the resultant alloy may be reduced. Other suitable mixtures are tin and silver oxides (especially for soldering brass, bronze and copper) and lead and tin oxides (especially for work requiring soft solders).

Instead of using oxides, compounds yielding oxides at a temperature lower than the soldering temperature may be used, such as hydroxides or carbonates.

While the mixtures of oxides may be prepared in any known manner, as for example by grinding, it is usually preferred to prepare the mixtures by the co-precipitation of suitable compounds, such as hydroxides, carbonates or oxalates, from which by subsequent treatment, such as heating, a very intimate mixture of oxides may be obtained.

The whole article to be soldered may be passed through a furnace in which is maintained an atmosphere of reducing gas, such as hydrogen, or an envelope may be provided which surrounds the joint and contains a reducing gas, the heating then being effected in any ordinary furnace by means of any desired local heating means.

The mixture of oxygen containing metal compounds may be made into a paste with water but it is preferred to use a suitable organic liquid, such as an alcohol or an ester for this purpose. In the latter case the solder appears to wet the surfaces to be joined much more readily than water. Among suitable alcohols for this purpose there may be mentioned the lower liquid aliphatic alcohols, such as isopropyl and butyl alcohols. Essential oils have also proved to be good wetting agents for the purposes of this invention.

It has been found that by the process according to this invention extremely strong joints may be prepared. This may be due to the fact that the reducing atmosphere in the immediate neighborhood of the joint not only reduces the mixtures of oxygen containing metal compounds to the corresponding metals but also reduces any film of oxide present on the surface to be soldered, whereby a very intimate bond between the layers of metal thus simultaneously formed is produced.

By reason of the fact that the mixtures of oxygen containing metal compounds used according to this invention are reducible to metal at a relatively low temperature, the physical properties of the jointed metal are not impaired so that it is unnecessary to carry out any subsequent processes of tempering or annealing or the like in order to bring the joined metal back to its original condition.

In carrying out the soldering process according to this invention, the surfaces of the members destined to be joined are provided with a coating of a mixture of oxygen containing metal compounds of the type defined either in powder or paste form and the members then placed and held in proper relation to each other, whereupon the joint is heated to the requisite temperature while a reducing atmosphere is provided or produced in the immediate neighbourhood of the joint. The manner in which the reducing atmosphere is set up will vary according to convenience and the particular circumstances, it being understood that there need be present only such an amount of reducing agent within the confines of or in the immediate vicinity of the joint that complete reduction of the mixture of oxygen containing metal compounds to metal and also of any film of oxide on the surface to be soldered is effected; any amount of reducing agent in excess of the said amount may, of course, be used if desired.

When using the said oxygen containing metal compounds in the form of a paste with a suitable liquid, the paste may be of any convenient consistency and may be applied to the surfaces to be joined by any suitable means, such as brushing, spraying or immersion.

The following examples give the compositions of mixtures which have proved suitable for soldering in accordance with this invention but the invention is not restricted to these examples.

Example 1

| | Per cent |
|---|---|
| Silver | 61 |
| Copper | 28.5 |
| Zinc and/or cadmium | 10.5 |

A solution of the nitrates of the above metals in the above proportions is treated with sufficient alkali (for example sodium) carbonate or hydroxide to precipitate all the metals as carbonates or hydroxides. The precipitate is washed free from alkali salts and dried at from 100° to 200° centigrade or it may be heated to 350° centigrade to produce a mixture of oxides, $CO_2$ and water being evolved. This mixture is finely ground and mixed with water, isopropyl alcohol or water containing a small amount of pine oil as a wetting agent. This oxide solder reduces completely at 800° centigrade in an atmosphere of hydrogen and the resultant alloy has a melting point of from 720° to 740° centigrade. It is suitable for soldering steels and copper and nickel alloys.

Example 2

| | Per cent |
|---|---|
| Silver | 55 |
| Copper | 25 |
| Tin | 20 |

The silver and copper are obtained in solution as neutral nitrates and are co-precipitated with tin oxide by the addition of caustic soda solution containing all the tin as sodium stannate, the amount of caustic soda and sodium oxide combined with stannic oxide as sodium stannate being from about 2 to 5 per cent more than that necessary to precipitate all the silver and copper as hydroxides. The caustic soda solution is added hot to the nitrate solution with vigorous stirring and the precipitate is washed, dried and heated to 350° centigrade as in Example 1. This oxide solder reduces completely at 650° centigrade in hydrogen. The resultant alloy has a melting point of from 577° to 600° centigrade. This oxide solder may be used for the same purposes as that in Example 1.

Example 3

| | Per cent |
|---|---|
| Silver | 10 |
| Tin | 90 |

This solder powder is produced by co-precipitation by a method similar to that used in Example 2 but, since there is a large excess of sodium stannate over that required to precipitate the silver, the alkaline solution obtained by mixing the sodium stannate with the silver nitrate is treated with sulphuric or nitric acid until it is almost neutral. In this way the whole of the tin is precipitated. The product is worked up in the same way as in the foregoing examples. The resultant solder powder is suitable for use in the low temperature soldering of brass, bronze and copper. The resultant alloy has a melting point of about 300° centigrade.

Example 4

| | Per cent |
|---|---|
| Lead | 34 |
| Tin | 66 |

A mixture of stannous and lead chlorides in the correct proportions is dissolved in a hot 25 to 30 per cent solution of sodium chloride and the two metals are co-precipitated by the addition of caustic soda or sodium carbonate solutions. The washed precipitate is heated at 350° centigrade for use.

What we claim is:

1. As a new article of manufacture, a paste composition for the soldering at temperatures below 1000° C. of steels, copper, nickel and their alloys, said solder consisting of a mixture of oxygen-containing metal compounds capable of reduction to metal at a temperature below 1000° C. to yield an alloy which melts below said temperature, and a paste forming liquid, said mixture containing no precious metal in the metallic state and said mixture being capable of said reduction when heated to said soldering temperature in an atmosphere of a reducing gas.

2. As a new article of manufacture, a paste composition for the soldering at temperatures below 1000° C. of steels, copper, nickel and their alloys, said solder consisting of a mixture of a plurality of metal compounds capable of reduction to metal at a temperature below 1000° C. to yield an alloy which melts below said temperature, and a paste-forming liquid, said compounds all containing oxygen in chemically combined form and the metals thereof including at least one metal other than the metals to be joined, said mixture being free of any precious metal in metallic form and capable of said reduction when heated to said soldering temperature in an atmosphere of a reducing gas.

3. As a new article of manufacture, a paste composition for the soldering at temperatures below 1000° C. of steels, copper, nickel and their alloys, said solder consisting of a mixture of metal compounds capable of reduction to metal at a temperature below 1000° C. to yield an alloy which melts below said temperature, and a paste forming liquid, the metals of said compound all being chemically combined with oxygen and consisting of copper and silver and at least one of the metals cadmium and zinc, and said mixture being capable of said reduction when heated to said soldering temperature in an atmosphere of a reducing gas.

4. As a new article of manufacture, a paste composition for the soldering at temperatures below 1000° C. of steels, copper, nickel and their alloys, said solder consisting of a mixture of metal compounds capable of reduction to metal at a temperature below 1000° C. to yield an alloy which melts below said temperature, and a paste forming liquid, the metals of said compound all being chemically combined with oxygen and consisting of tin, copper and silver, and said mixture being capable of said reduction when heated to said soldering temperature in an atmosphere of a reducing gas.

5. As a new article of manufacture, a paste composition for the soldering at temperatures below 1000° C. of steels, copper, nickel and their alloys, said solder consisting of a mixture of metal compounds capable of reduction to metal at a temperature below 1000° C. to yield an alloy which melts below said temperature, and a paste forming liquid, the metals of said compound all being chemically combined with oxygen and consisting of tin and silver, and said mixture being capable of said reduction when heated to said soldering temperature in an atmosphere of a reducing gas.

6. As a new article of manufacture, a paste composition for the soldering at temperatures below 1000° C. of steels, copper, nickel and their alloys, said solder consisting of a mixture of oxygen containing metal compounds capable of reduction to metal at a temperature below 1000° C. to yield an alloy which melts below said temperature, and a paste forming liquid, the metals of said compounds including at least one metal other than the metals to be joined, said other metal reducing the melting point of the resulting alloy, said mixture being free of any precious metal in metallic form and containing no non-volatile reducing agent, said mixture being capable of said reduction when heated to said soldering temperature in an atmosphere of a reducing gas.

PERCY WARREN NOBLE.
ALAN RICHARD POWELL.